United States Patent
Jones et al.

(10) Patent No.: US 9,665,502 B1
(45) Date of Patent: *May 30, 2017

(54) VIRTUAL I/O HARDWARE

(71) Applicant: EMC Corporation, Hopkinton, MA (US)

(72) Inventors: Jeff L. Jones, Wake Forest, NC (US); Douglas E. LeCrone, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 693 days.

This patent is subject to a terminal disclaimer.

(21) Appl. No.: 14/133,852

(22) Filed: Dec. 19, 2013

Related U.S. Application Data

(63) Continuation-in-part of application No. 12/215,984, filed on Jun. 30, 2008, now Pat. No. 9,170,904.

(51) Int. Cl.
G06F 9/455 (2006.01)
G06F 13/10 (2006.01)
G06F 9/54 (2006.01)

(52) U.S. Cl.
CPC ............ *G06F 13/105* (2013.01); *G06F 9/542* (2013.01)

(58) Field of Classification Search
CPC ............................... G06F 13/105; G06F 9/542
USPC .......................................................... 703/23
See application file for complete search history.

(56) References Cited

U.S. PATENT DOCUMENTS

| | | | |
|---|---|---|---|
| 5,742,792 A | 4/1998 | Yanai et al. | |
| 6,917,621 B1 * | 7/2005 | Silver | H04W 4/10 370/401 |
| 6,954,835 B1 | 10/2005 | LeCrone et al. | |
| 6,986,009 B1 | 1/2006 | LeCrone et al. | |
| 7,000,086 B2 | 2/2006 | Meiri et al. | |
| 7,054,883 B2 | 5/2006 | Meiri et al. | |
| 7,165,201 B2 | 1/2007 | Groz | |
| 7,174,274 B2 | 2/2007 | Carlson et al. | |
| 7,185,232 B1 | 2/2007 | Leavy et al. | |
| 7,707,186 B2 | 4/2010 | LeCrone et al. | |
| 2008/0059638 A1 * | 3/2008 | Hathorn | H04L 47/10 709/227 |

OTHER PUBLICATIONS

U.S. Appl. No. 13/334,884, filed Dec. 22, 2011, LeCrone et al.

* cited by examiner

*Primary Examiner* — Saif Alhija
(74) *Attorney, Agent, or Firm* — Muirhead and Saturnell, LLP

(57) ABSTRACT

Emulating a Fiber Channel connection to a workstation includes providing a first Fiber Channel emulator that exchanges data between the workstation and a data storage device using a connection mechanism between the workstation and the data storage device, wherein the connection mechanism is incompatible with a Fiber Channel connection and handling emulator events received at the emulator, wherein the events include message events, state events, and driver events. The first Fiber Channel emulator may act as an I/O subsystem providing FICON communication capability. The connection mechanism may be an Ethernet connection. The first Fiber Channel emulator may send a message to a link layer which sends a message to an SLI driver which builds a ring queue message and passes the message to an emulated hardware layer which packages up the message indicating status. The message may be sent using the connection mechanism.

14 Claims, 4 Drawing Sheets

VIRTUAL I/O HARDWARE

CROSS-REFERENCE TO RELATED APPLICATION

This application is a continuation-in-part of U.S. patent application Ser. No. 12/215,984 filed on Jun. 30, 2008 titled: "I/O FAULT INJECTION USING SIMULATED COMPUTING ENVIRONMENTS" (pending), which is incorporated by reference herein.

TECHNICAL FIELD

This application relates to the field of computer systems and, more particularly, to emulation, simulation and testing of computing systems, including software and hardware platforms used therewith.

BACKGROUND OF THE INVENTION

Mainframe computers are large scale computer system architectures that are used by large organizations for bulk data processing, such as financial transaction processing. Mainframe computers offer enhanced availability, scalability, reliability and security along with high volume data throughput, among other features. Input/Output (I/O) devices may be coupled to interact with mainframe computers that may include an I/O subsystem that communicates with the I/O devices over communication channels. The I/O subsystem controls data flow between I/O devices and main storage. The I/O subsystem may be coupled to the central processors of the main system and may communicate directly with the I/O devices. I/O subsystem may communicate with the I/O devices using multiple types of interfaces, including, for example, communication channels such as Fibre channels.

Emulation of hardware and software systems may be useful in connection with testing and other operations of I/O devices and/or other software applications and hardware components that interface with a computing environment. One reason, in particular, for emulation is that the cost of running a native environment may be significant. However, in many hardware/software emulation environments, it is still necessary to provide a relatively expensive connection to I/O devices. For example, FIG. 1 shows a conventional system that includes a workstation 10 with an operating system 12 and a Fibre Channel connection portion 16, which includes hardware and/or software for facilitating a Fibre Channel data connection between the workstation 10 and a conventional data storage device 50. As mentioned above, the Fibre Channel connection may be relatively expensive.

Accordingly, it is desirable to provide improved software and hardware that eliminates or reduces relatively expensive connections to I/O devices.

SUMMARY OF THE INVENTION

According to the system described herein, emulating a Fibre Channel connection to a workstation includes providing a first Fibre Channel emulator that exchanges data between the workstation and a data storage device using a connection mechanism between the workstation and the data storage device, wherein the connection mechanism is incompatible with a Fibre Channel connection and handling emulator events received at the emulator, wherein the events include message events, state events, and driver events. The first Fibre Channel emulator may act as an I/O subsystem providing FICON communication capability. The connection mechanism may be an Ethernet connection. The first Fibre Channel emulator may send a message to a link layer which sends a message to an SLI driver which builds a ring queue message and passes the message to an emulated hardware layer which packages up the message indicating status. The message may be sent using the connection mechanism. The message may be received by a second Fibre Channel emulator coupled to the connection mechanism and turned into a ring queue message and data in a buffer. The second Fibre Channel emulator may cause the ring queue message and data in a buffer to appear to the data storage device as if an actual Fibre Channel connection had been used to send the data. The workstation and/or the data storage device may be provided in a virtual environment.

According further to the system described herein, computer software, provided in a non-transitory computer-readable medium, emulates a Fibre Channel connection to a workstation. The software includes executable code that exchanges data between the workstation and a data storage device using a connection mechanism between the workstation and the data storage device, wherein the connection mechanism is incompatible with a Fibre Channel connection and executable code that handles emulator events received at the emulator, wherein the events include message events, state events, and driver events. The executable code that exchanges data between the workstation and the data storage device may act as an I/O subsystem providing FICON communication capability. The connection mechanism may be an Ethernet connection. The executable code that exchanges data between the workstation and a data storage device emulator may send a message to a link layer which sends a message to an SLI driver which builds a ring queue message and passes the message to an emulated hardware layer which packages up the message indicating status. The message may be sent using the connection mechanism. The software may also include executable code that receives the message via the connection mechanism and converts the message into a ring queue message and data in a buffer. The software may also include executable code that causes the ring queue message and data in a buffer to appear to the data storage device as if an actual Fibre Channel connection had been used to send the data. The workstation and/or the data storage device may be provided in a virtual environment.

BRIEF DESCRIPTION OF THE DRAWINGS

Embodiments of the system are described with reference to the several figures of the drawings, noted as follows.

DETAILED DESCRIPTION OF VARIOUS EMBODIMENTS

Figure 2:
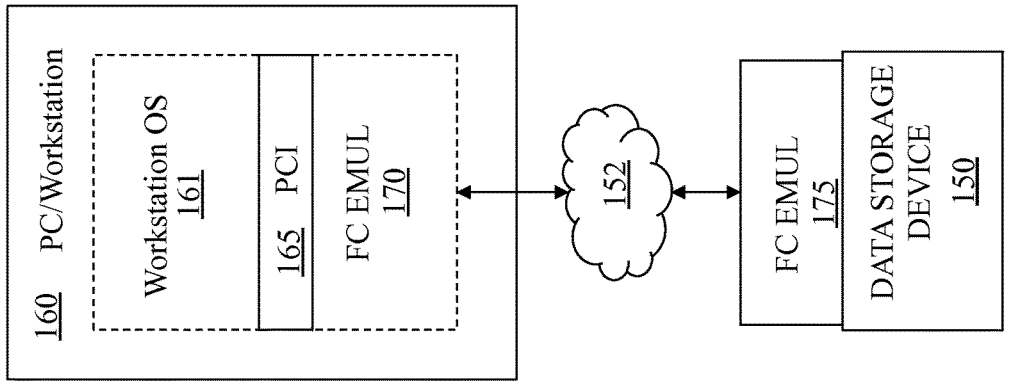
FIG. 2 is a schematic illustration showing use of a Fibre Channel emulator and a relatively inexpensive remote connection mechanism according to an embodiment of the system described herein.
Figure 1:
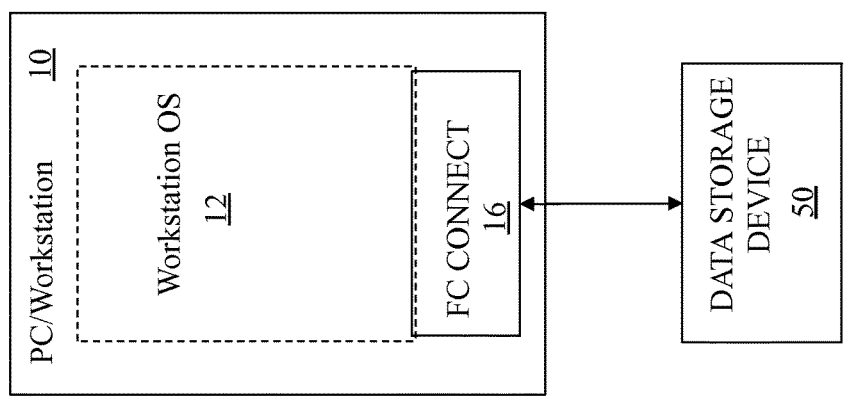
FIG. 1 is a schematic illustration showing a conventional system with a Fibre Channel connection between a workstation and a data storage device.

Referring now to the figures of the drawing, the figures comprise a part of this specification and illustrate exemplary embodiments of the described system. It is to be understood that in some instances various aspects of the system may be shown schematically or may be shown exaggerated or altered to facilitate an understanding of the system.

In an embodiment of the system described herein, one or more emulators may be used to provide virtual Fibre Channel connections between workstation(s) and data storage device(s). The use of virtual connections may reduce costs. The system described herein may provide for testing capabilities using virtual connections and/or other simulated hardware or software components, as further discussed elsewhere herein.

FIG. 2 is a schematic illustration of a PC/Workstation running Linux or some other operating system 161, according to an embodiment of the system described herein. The PC/Workstation 160 may have a Peripheral Component Interconnect (PCI) layer 165 that may provide an interconnection for I/O operations. The I/O processing on the workstation 160 may operate with a first Fibre Channel emulator 170 that emulates the Fibre Channel FC0 physical layer so that the PCI layer 165 sends and receives data as if the PCI layer 165 were connected to a physical Fibre Channel connector. The first Fibre Channel emulator 170 acts as an I/O subsystem providing FICON communication capability for the workstation 160.

The first Fibre Channel emulator 170 also sends and receives data to and from a data storage device 150 using a relatively inexpensive remote connection mechanism 152 in a way that is transparent (not detectable) by the PCI layer 165. The data storage device 150 may include physical storage volumes and/or logical volumes, such as EMC Corporation's Symmetrix data storage facility.

The connection mechanism 152 may include an Internet connection and/or possibly some other types of connection(s). In an embodiment herein, the connection mechanism 152 may be directly incompatible with a Fibre Channel connection. The incompatibility may be hardware incompatibility, software incompatibility, or both. Generally, the connection mechanism 152 does not support a direct Fibre Channel connection but, instead, relies on the Fibre Channel emulator (and/or other emulator(s)) for providing data in an appropriate format.

A second Fibre Channel emulator 175 sends and receives data to and from the connection mechanism 152 and also emulates a Fibre Channel FC0 physical layer for the benefit of the data storage device 150. Thus, both the workstation 160 and the data storage device 150 operate as if the devices 160, 150 were communicating using a Fibre Channel hardware connection.

The first Fibre Channel emulator 170 allows the PCI layer 165 to use the same driver code that normally controls FICON hardware so that the system may be tested in the same way as if the system were using an actual FICON connection between the workstation 160 and the data storage device 150. Using the Fibre Channel emulator 170 may be much cheaper than providing an actual FICON connection. In addition, using the Fibre Channel Emulator allows for emulation of special cases of hardware behavior that can be impossible or extremely difficult to cause using actual hardware.

In an embodiment herein, an unsolicited asynchronous status interrupt initiates a FICON emulation which sends a message to a link layer which sends a message to an SLI driver which builds a ring queue message and passes the message to an emulated hardware layer which packages up a message indicating status. The message may be sent via the remote connection mechanism 152 and decoded by the second Fibre Channel emulator 175 and turned into a ring queue message and data in a buffer. The second Fibre Channel emulator 175 causes the ring queue message and data in a buffer to appear to the data storage device 150 exactly as if an actual Fibre Channel connection had been used. The second Fibre Channel emulator 175 signals an SLI driver of the data storage device 150 that a new message has arrived. The data storage device 150 then receives the data in the same manner as if the data storage device 150 were connected to the workstation 160 via an actual Fibre Channel connection.

In an embodiment herein, the first Fibre Channel emulator 170 may be implemented as software running on the workstation 160 while the second Fibre Channel emulator 175 may be implemented as a stand alone processing device that is coupled to the data storage device 150 using any appropriate mechanism, including possibly a Fibre Channel connection. In other embodiments, the Fibre Channel emulator 170 may be implemented as a combination of hardware and software, such as a card in the workstation 160 that emulates Fibre Channel hardware when communicating with the PCI layer 165 and uses, for example, TCP/IP when communicating outside the workstation 160 via the connection mechanism 152. Other possible configurations of the first Fibre Channel emulator 170 and the second Fibre Channel emulator 175 are discussed elsewhere herein.

In an embodiment, the system described herein provides for a channel emulator to emulate data transfer paths in I/O operations. The channel emulator may simulate a host channel to provide I/O connectivity with an I/O device and may provide for the I/O connectivity using different channel protocols. For example, INCITS FC-SB-5 FICON (Fiber Connection) is a Fibre Channel protocol that provides high-speed connectivity between a channel and a control device and allows multiple data exchanges in full duplex mode. FICON may be used with Fibre Channel communication.

Figure 4:
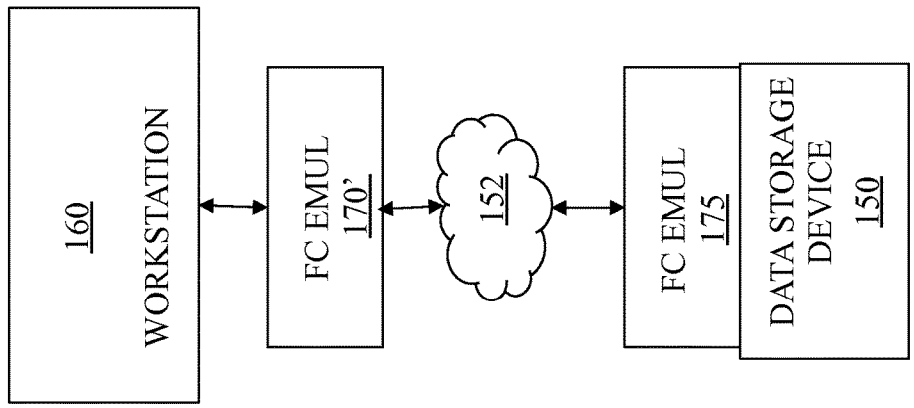
FIG. 4 is a schematic illustration showing use of a workstation with a Fibre Channel emulator according to an alternative embodiment of the system described herein.
Figure 3:
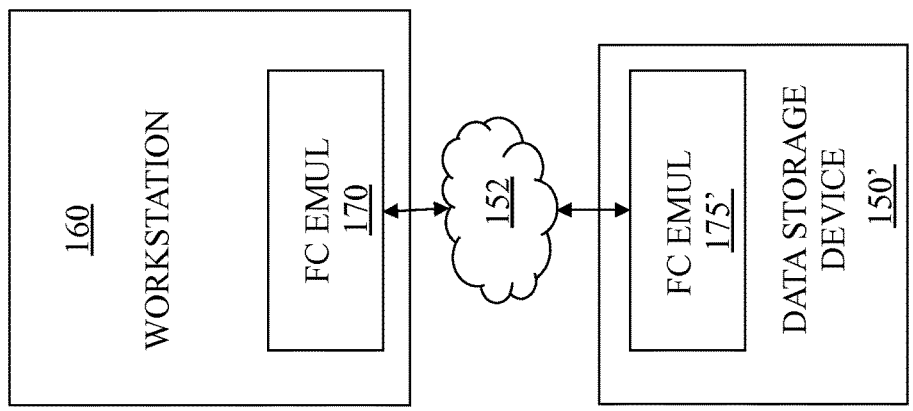
FIG. 3 is a schematic illustration showing use of a workstation with a Fibre Channel emulator according to an alternative embodiment of the system described herein.

Referring to FIG. 3, the workstation 160 is shown with the first Fibre Channel emulator 170 coupled to the connection mechanism 152. FIG. 4 also shows a data storage device 150' that is similar to the data storage device 150, discussed above. A second Fibre Channel emulator 175', which is similar to and performs essentially the same functions as the second Fibre Channel emulator 175, discussed above, is integrated with the data storage device 150'. The second Fibre Channel emulator 175' may be implemented using software. The data storage device 150' may be coupled directly to the connection mechanism 152 using, for example, an Ethernet adaptor and cable.

Referring to FIG. 4, a workstation 160', similar to the workstation 160, described above, is shown as being coupled to a first Fibre Channel emulator 170', which is similar to and performs essentially the same functions as the first Fibre Channel emulator 170, described above. The connection between the workstation 160' and the first Fibre Channel emulator 170' may be any appropriate Fibre Channel connection, such as FICON or SCSI. The first Fibre Channel emulator 170' may be implemented using a stand-alone processing device, such as a workstation programmed to provide appropriate functionality. The first Fibre Channel emulator 170' is couple to the connection mechanism 152, which is used to transmit data between the workstation 160' and the data storage device 150. As discussed above, the data storage device 150 is coupled to the connection mechanism 152 using the second Fibre Channel emulator 175, discussed above.

In the embodiment of FIG. 4, the emulator 170' provides an actual Fibre Channel connection to the workstation 160' while also transferring data using the connection mechanism 152 (e.g., an Ethernet connection). The Fibre Channel emulator 170' translates Fibre Channel data received from the workstation 160' into an emulation protocol and sends the data to the data storage device 150 via the connection mechanism 152. Data received by the Fibre Channel emulator 170' from the data storage device 150 (via the connection mechanism 152) is translated into commands to control the actual Fibre Channel connection between the Fibre Channel emulator 170' and the data storage device 150.

Figure 5:
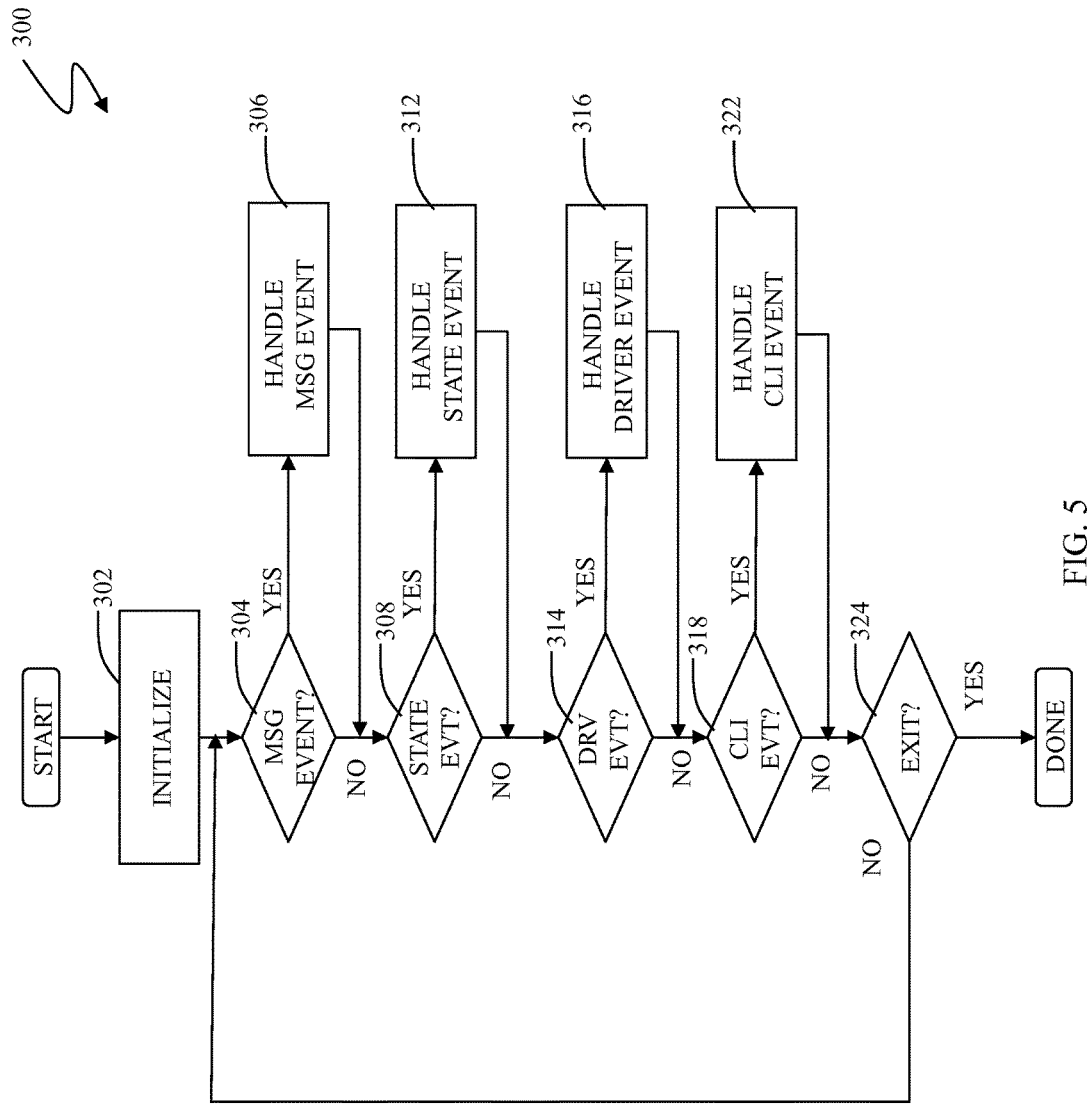
FIG. 5 is a flow diagram showing operation of a Fibre Channel emulator according to an embodiment of the system described herein.

Referring to FIG. 5, a flow diagram 300 illustrates processing performed by the first Fibre Channel emulator 170 and/or the second Fibre Channel emulator 175 in connection with providing connectivity via the connection mechanism 152. Processing begins at a first step 302 where the emulator is initialized. Specific initialization operations performed at the step 302 depend upon the specific hardware on which the initialization is performed. In the case of the workstation 160, for example, initialization at the step 302 may include initializing communication between hardware of the PCI layer 165 and the connection mechanism 152 and performing Fibre Channel initialization of virtual Fibre Channel ports used by the PCI layer 165. Note that initialization at the step 302 may include allocation of shared buffers and setting various device states to an initial value.

Following the step 302 is a test step 304 where it is determined if a message event has occurred. If so, then control transfers from the test step 304 to a step 306 where the message event is handled. Message events are used to send data, status information, and configuration commands using the Fibre Channel protocol. In an embodiment herein, the emulator receives Fibre Channel messages and performs a corresponding action either to configure or return status of the virtual Fibre Channel connection or to send or receive data using the connection. For example, Fibre Channel calls to initiate a port connection may cause the emulator to establish a communication link using the connection 52 and appropriate exchanges to establish an SSL connection over a TCP/IP network represented by the connection mechanism 152. The emulator may also handle messages to read the state of a virtual port, read virtual port configuration data, read virtual subchannel data, start the virtual subchannel, etc.

Following the step 306 or following the step 304 if no message event is present is a test step 308, which determines if a state event has occurred. If so, then control transfers from the test step 308 to a step 312 where the state event is handled. In an embodiment herein, the emulator maintains state information for each of the virtual Fibre Channel ports. In some cases, events may occur that change the state of a virtual port. For example, if a virtual Fibre Channel port is in a link up state, but Internet connectivity represented by the connection mechanism 152 is lost, then the emulator may change the state of the virtual port.

Following the step 312 or following the step 308 if no state event is detected is a test step 314 where it is determined if a driver event has occurred. If so, then control transfers from the test step 314 to a step 316 where the driver event is handled. In some cases, an event may occur that is specific to the emulator itself. For example, the emulator may internally keep track of a number of virtual port state changes in a given time and the tracking may cause emulator-specific events to occur.

Following the step 316 or following the step 314 if no driver events have occurred is a test step 318 where it is determined if a CLI (Command Line Interface) event has occurred. If so, then control transfers from the test step 318 to a step 322 where the CLI event is handled. In an embodiment herein, a CLI is provided to allow a user to make changes and receive information from the emulator. For example, there may be a specific CLI that causes the emulator to provide statistical information about the virtual ports or a CLI command that sets a number of usable CLI ports. Note that, in some embodiments, the CLI may not be provided.

Following the step 322 or following the step 318 if no CLI events have occurred is a test step 324 where it is determined if the emulator is exiting (e.g., because emulation is being terminated or the system is being powered down). If so, then processing is complete. Otherwise, control transfers from the test step 324 back to the step 304, discussed above, for another iteration. Essentially, as long as emulation is running, the emulator performs a loop to detect events.

Figure 6:
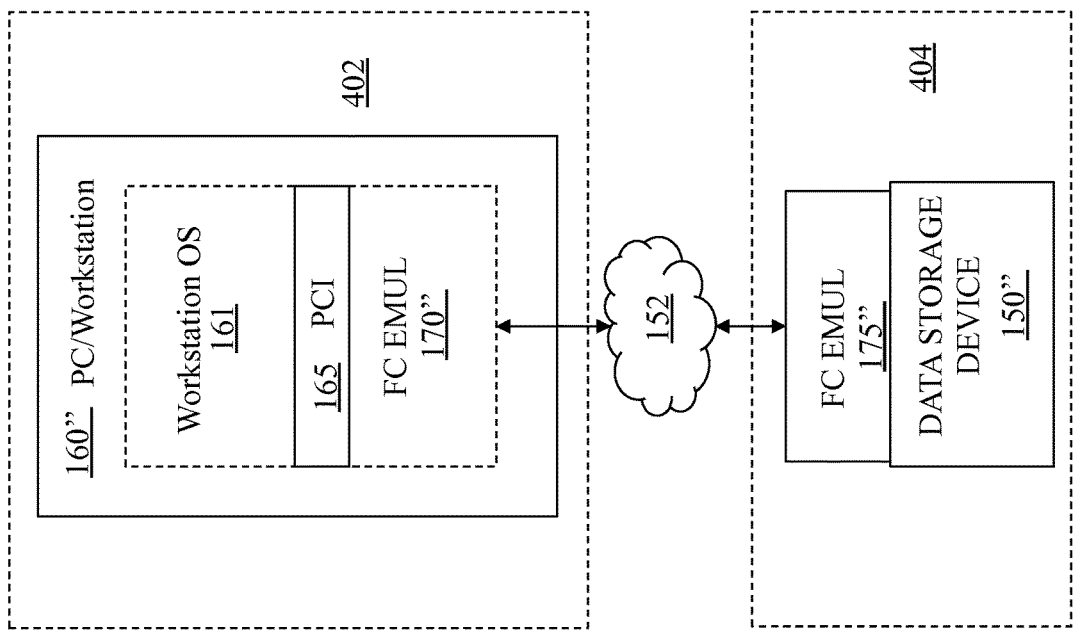
FIG. 6 is a schematic illustration showing use of a workstation with a Fibre Channel emulator in a virtualized environment according to an embodiment of the system described herein.

Referring to FIG. 6, an alternative embodiment is shown where a workstation 160" having a Fibre Channel emulator 170" is provided in a virtual environment 402. The virtual environment 402 may be provided by using products from VMware or similar products or systems. The workstation 160" and the Fibre Channel emulator 170" may be a virtualized instances of a workstation and a Fibre Channel emulator, respectively, running in the virtual environment 402. Similarly, a data storage device 150" having a Fibre Channel emulator 175" may also be provided in a virtual environment 404 that may be implemented using products provided by VMware or similar. The data storage device 150" and the Fibre Channel emulator 175" may be a virtualized instances of a data storage device and a Fibre Channel Emulator, respectively, running in the virtual environment 404. Note that the workstation 160" and the Fibre Channel emulator 170" of the virtual environment 402 may be coupled to an actual data storage device like the data storage device 150 described elsewhere herein. Similarly, the data storage device 150" and the Fibre Channel emulator 175" of the virtual environment 404 may be coupled to an actual workstation, like the workstation 160 described elsewhere here. The emulators 170", 175" may be implemented using software and may be identical or very similar to other Fibre Channel emulators described herein.

Use of the emulators 170", 175" in the virtual environments 402, 404 eliminates a need to provided virtual Fibre Channel connectivity. Instead, the workstation 160" and/or the data storage device 150" may use virtual Ethernet connectivity, which is more likely to be generally available in a virtual environment, Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for emulating a Fibre Channel connection to a workstation, comprising:
   providing a first Fibre Channel emulator that exchanges data between the workstation and a data storage device using a connection mechanism between the workstation and the data storage device, wherein the connection mechanism is incompatible with a Fibre Channel connection; and
   handling emulator events received at the emulator, wherein the events include message events, state events, and driver events, wherein the first Fibre Channel emulator sends a message to a link layer which sends a message to an SLI driver which builds a ring queue message and passes the message to an emulated hardware layer which packages up the message indicating status.

2. A method, according to claim 1, wherein the first Fibre Channel emulator acts as an I/O subsystem providing FICON communication capability.

3. A method, according to claim 1, wherein the connection mechanism is an Ethernet connection.

4. A method, according to claim 1, wherein the message is sent using the connection mechanism.

5. A method, according to claim 4, wherein the message is received by a second Fibre Channel emulator coupled to the connection mechanism and turned into a ring queue message and data in a buffer.

6. A method, according to claim 5, wherein the second Fibre Channel emulator causes the ring queue message and data in a buffer to appear to the data storage device as if an actual Fibre Channel connection had been used to send the data.

7. A method, according to claim 1, wherein at least one of: the workstation and the data storage device are provided in a virtual environment.

8. Computer software, provided in a non-transitory computer-readable medium, that emulates a Fibre Channel connection to a workstation, the software comprising:
   executable code that exchanges data between the workstation and a data storage device using a connection mechanism between the workstation and the data storage device, wherein the connection mechanism is incompatible with a Fibre Channel connection; and
   executable code that handles emulator events received at the emulator, wherein the events include message events, state events, and driver events, wherein the executable code that exchanges data between the workstation and a data storage device emulator sends a message to a link layer which sends a message to an SLI driver which builds a ring queue message and passes the message to an emulated hardware layer which packages up the message indicating status.

9. Computer software, according to claim 8, wherein the executable code that exchanges data between the workstation and the data storage device acts as an I/O subsystem providing FICON communication capability.

10. Computer software, according to claim 8, wherein the connection mechanism is an Ethernet connection.

11. Computer software, according to claim 8, wherein the message is sent using the connection mechanism.

12. Computer software, according to claim 11, further comprising:
   executable code that receives the message via the connection mechanism and converts the message into a ring queue message and data in a buffer.

13. Computer software, according to claim 12, further comprising:
   executable code that causes the ring queue message and data in a buffer to appear to the data storage device as if an actual Fibre Channel connection had been used to send the data.

14. Computer software, according to claim 8, wherein at least one of: the workstation and the data storage device are provided in a virtual environment.

* * * * *